(12) United States Patent
Ha et al.

(10) Patent No.: US 8,136,108 B2
(45) Date of Patent: Mar. 13, 2012

(54) UPDATING FIRMWARE WITH MULTIPLE PROCESSORS

(75) Inventors: Wai-leung Ha, Pokfulam (HK); Kairy Kai Lei, Shen Zhen (CN); Gordon Qian, Shen Zhen (CN)

(73) Assignee: Computime, Ltd, Hong Kong (HK)

( * ) Notice: Subject to any disclaimer, the term of this patent is extended or adjusted under 35 U.S.C. 154(b) by 861 days.

(21) Appl. No.: 12/203,503

(22) Filed: Sep. 3, 2008

(65) Prior Publication Data

US 2010/0058316 A1    Mar. 4, 2010

(51) Int. Cl.
*G06F 9/44* (2006.01)

(52) U.S. Cl. ........ 717/168; 717/170; 717/173; 717/176; 717/178

(58) Field of Classification Search .................. 717/168, 717/169, 176, 178, 170, 173; 714/1, 100
See application file for complete search history.

(56) References Cited

U.S. PATENT DOCUMENTS

| | | | |
|---|---|---|---|
| 5,537,598 A | 7/1996 | Kukula et al. | |
| 6,113,652 A * | 9/2000 | Lysik et al. | 717/170 |
| 6,725,324 B2 | 4/2004 | Collins et al. | |
| 7,000,101 B2 * | 2/2006 | Wu et al. | 713/1 |
| 7,036,007 B2 | 4/2006 | Schelling et al. | |
| 7,065,560 B2 * | 6/2006 | Erickson et al. | 709/219 |
| 7,200,390 B1 | 4/2007 | Henager et al. | |
| 7,299,463 B2 * | 11/2007 | Brannock et al. | 717/169 |
| 7,334,117 B2 | 2/2008 | Wilson et al. | |
| 7,502,813 B2 * | 3/2009 | Ljung | 1/1 |
| 7,542,757 B2 * | 6/2009 | Fishman et al. | 455/419 |
| 7,558,949 B2 * | 7/2009 | Inada et al. | 713/2 |
| 7,587,433 B2 * | 9/2009 | Peleg et al. | 1/1 |
| 7,797,693 B1 * | 9/2010 | Gustafson et al. | 717/168 |
| 7,987,449 B1 * | 7/2011 | Marolia et al. | 717/120 |
| 8,028,282 B2 * | 9/2011 | Brannock et al. | 717/169 |
| 8,095,634 B2 * | 1/2012 | Rao | 709/223 |
| 2004/0049654 A1 * | 3/2004 | Chrysanthakopoulos et al. | 712/35 |
| 2004/0088473 A1 * | 5/2004 | Ogle | 711/100 |

(Continued)

FOREIGN PATENT DOCUMENTS

| | | |
|---|---|---|
| CN | 1695118 A | 11/2005 |
| CN | 101192165 A | 6/2008 |

OTHER PUBLICATIONS

Linus Walleij, "Firmware loading using standardized protocols", Nov. 15, 2004.*

(Continued)

*Primary Examiner* — Phillip Nguyen
(74) *Attorney, Agent, or Firm* — Banner & Witcoff, Ltd

(57) ABSTRACT

The present invention provides apparatuses, methods, and computer readable media for updating memory containing representations of computer-executable instructions in a processing system. A primary processor receives original sets of computer-readable instructions and updated sets of computer-readable instructions for the processors in processor system from a host system. The sets of computer-readable instructions are stored in memory (e.g., flash memory), where each processor in the system may utilize different sets. The primary processor then initiates updating its firmware with the corresponding updated set. If the update is unsuccessful, the primary processor reverts to the original set and the update process is terminated. Otherwise, the firmware update proceeds to the secondary processor. If the firmware update succeeds, the next secondary processor is updated. Otherwise, all of the updated processors revert to the corresponding original set of computer-readable instructions and the updating process is terminated.

19 Claims, 10 Drawing Sheets

U.S. PATENT DOCUMENTS

| | | | |
|---|---|---|---|
| 2005/0055595 A1* | 3/2005 | Frazer et al. | 713/400 |
| 2005/0132351 A1* | 6/2005 | Randall et al. | 717/168 |
| 2006/0080523 A1* | 4/2006 | Cepulis | 713/100 |
| 2006/0085564 A1* | 4/2006 | Bomhoff et al. | 710/8 |
| 2006/0112152 A1* | 5/2006 | Napier et al. | 707/203 |
| 2007/0174601 A1* | 7/2007 | Douglas et al. | 713/1 |
| 2007/0174686 A1* | 7/2007 | Douglas et al. | 714/13 |
| 2007/0239944 A1* | 10/2007 | Rupanagunta et al. | 711/147 |
| 2008/0052699 A1 | 2/2008 | Baker et al. | |

OTHER PUBLICATIONS

Nilsson et al., "Secure Firmware Updates over the Air in Intelligent Vehicles", 2008.*

Shaligram, "Disturbance Rejection and Embedded Networking for a Class of Commercial DC-DC Power Converters", 2006.*

International Search Report for PCT/CN2009/073695, dated Dec. 10, 2009, pp. 1-4.

* cited by examiner

UPDATING FIRMWARE WITH MULTIPLE PROCESSORS

BACKGROUND

The complexity of processing systems, which are often deployed remotely, are increasing. Consequently, firmware often needs to be updated to provide enhanced functionality and to correct problems ("bugs") when executing the computer-executable instructions in the firmware. Wireless technology (e.g., RF wireless communications or wireless networking technology) is often used to update the firmware, in which a small portion of the firmware (typically referred as a boot loader) updates the firmware by communicating with another system. Under ideal conditions, the updating process may be straight-forward. However, communications over the wireless communications channel may incur transmission errors, thus resulting in an unsuccessful update.

Many types of devices include non-volatile memory that stores program instructions that are executed after power is applied or upon reset. These program instructions typically perform various initialization functions and then initiate loading and execution of other software. Typically, the initialization program instructions are referred to as firmware and are often stored in either ROM (read-only memory) or EPROM (electrically programmable read-only memory). However, using ROM or EPROM devices to store the firmware had several drawbacks. One such drawback is that to install new or different versions of firmware, there is the need for physical replacement of a ROM device or manipulation such as irradiating an EPROM device with ultraviolet light and then using an EPROM programmer to store new firmware on the EPROM device.

Electrically erasable programmable read only memory (EEPROM) devices are often used instead of ROM or EPROM devices to store firmware because of the drawbacks discussed above. New firmware may be installed without the need for physical replacement or manipulation. There may be drawbacks with this approach. First, the entire storage of an EEPROM may need to be rewritten to update the firmware. In other words, a portion of the EEPROM may not be written to specifically. Consequently, the firmware updating procedure may be vulnerable to power failures or other errors (e.g., software bugs) in the firmware itself. If the firmware has an error, it may render the device or computer system non-operational. Consequently, a physical replacement of the EEPROM device may be required if an error occurs in the firmware. Versions of EEPROM's are available where it is possible to update a portion of the EEPROM without updating the entire EEPROM. This type of EEPROM can be found in flash memory cards for digital cameras, among other devices, and is also used to store firmware for devices and computer systems.

When updating firmware in a processing system, the entire firmware is often replaced. Prior art methods for updating firmware in non-volatile memory may still include the drawbacks related to errors in the firmware (e.g., power failures, software bugs) interrupting the upgrade process and thus rendering the device inoperable.

Consequently, there is a real market need for the processing system to be able to recover from errors when updating firmware in order to maintain functionality of a processing system.

SUMMARY

The present invention provides apparatuses, methods, and computer readable media for updating memory containing representations of computer-executable instructions in a processing system.

With another aspect of the invention, a first processor (designated as a primary processor in a processor system) receives original sets of computer-readable instructions and updated sets of computer-readable instructions for a plurality of processors in processor system. The sets of computer-readable instructions are stored in memory (e.g., flash memory), where each processor in the system may utilize different sets. The primary processor then initiates updating its firmware with the corresponding updated set. If the update is unsuccessful, the primary processor reverts to the original set and the update process is terminated. Otherwise, the firmware update proceeds to the next processor (designated as a secondary processor). If the firmware update succeeds, the next secondary processor is updated. Otherwise, all of the updated processors revert to the corresponding original set of computer-readable instructions and the updating process is terminated.

With another aspect of the invention, the primary processor of a processor system receives an initiation request to update computer-readable instructions for the processor system from a host system. The primary processor consequently notifies the host system about original computer versions associated with the plurality of processors.

With another aspect of the invention, the primary processor communicates with the secondary processors when updating the firmware over an internal communications bus.

With another aspect of the invention, the host system communicates with the processor system over a wireless communications channel when providing the original sets and updated sets of computer-executable instructions.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

Figure 1:
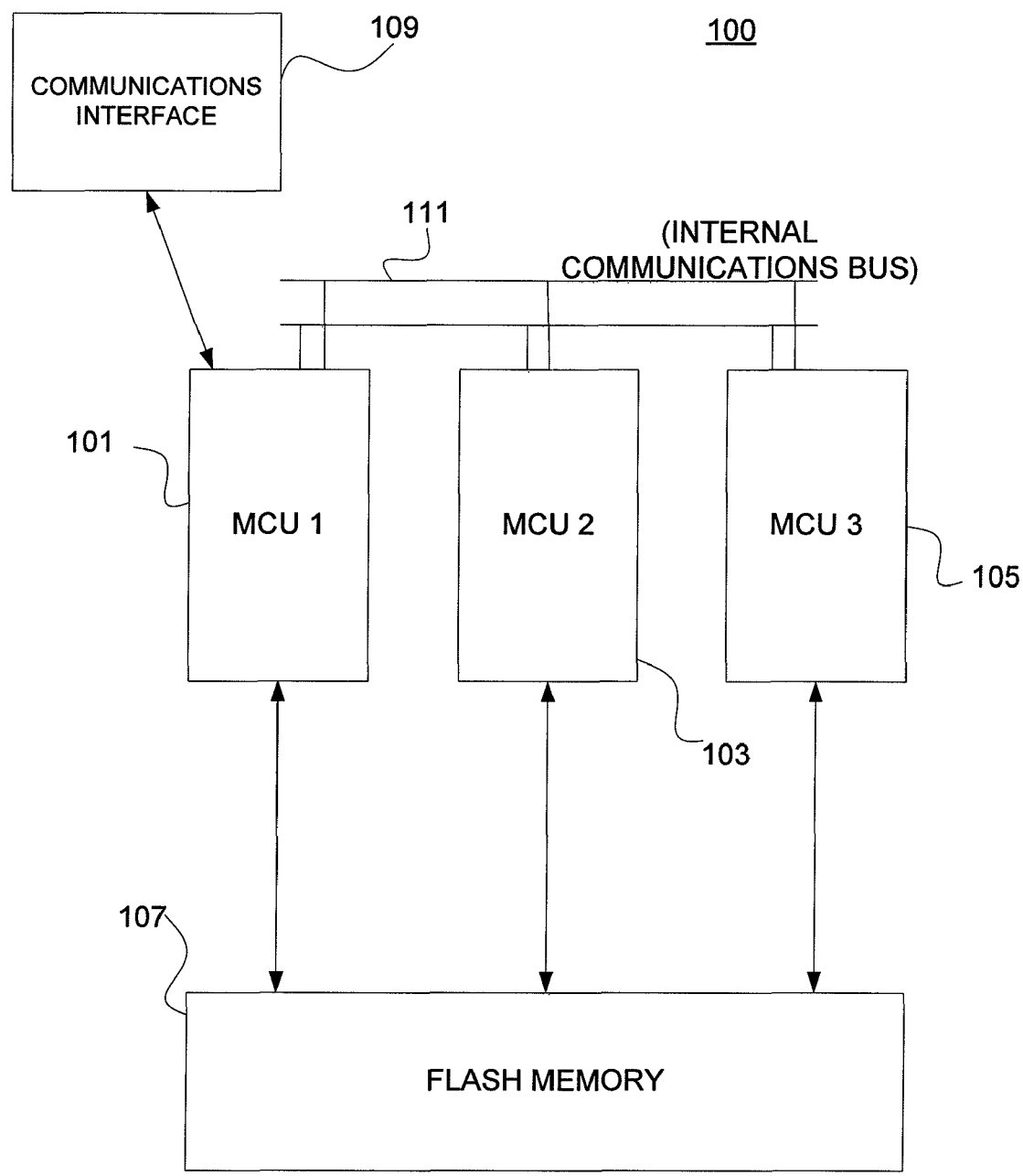
FIG. 1 shows a microprocessor system for updating firmware in accordance with an embodiment of the invention.

FIG. 1 shows microprocessor system 100 for updating firmware in accordance with an embodiment of the invention. For example, microprocessor system 100 may support a Zig-Bee-based thermostat or load switches that use more than one processor.

Microprocessor system 100 includes microcontroller (MCU) 101, microcontroller 103, and microcontroller 105. Embodiments support either updating the firmware of all processors or a subset of the processors in system 100. Microcontroller 101, 103, or 105 may be a functional computer system-on-a-chip containing a processor core (central processing unit), memory (e.g., a small amount of random access memory (RAM), program memory having computer-readable instructions, or both), and programmable input/output peripherals. However, microcontroller 101, 103, or 105 may include a separate processor (microprocessor), memory, and peripheral interfaces.

With an embodiment of the invention, MCU 101 functions as the primary processor while MCU 103 and MCU 105 function as secondary processors. Consequently, MCU 101 coordinates activities over internal communications bus 111 among the plurality of microcontrollers, including updating firmware versions for the plurality of microcontrollers. For example, different microcontrollers may support different functions for microprocessor system 100 and consequently each microcontroller may execute different sets of computer-readable instructions.

In computing, firmware is a computer program that is embedded in a hardware device, for example a microcontroller. It may also be provided on flash memory or as a binary image file that can be uploaded onto existing hardware by a user.

Firmware typically denotes the programmable content of a hardware device, which may consist of machine language for a microprocessor or configuration settings for a fixed-function device or programmable logic device. Firmware may often be updated after manufacturing. Reprogramming (updating) is usually done electronically in modern systems.

Firmware is traditionally stored on ROM; however, cost and performance requirements have driven component vendors to adopt various replacements, including non-volatile media such as electrically erasable programmable read-only memory (EEPROM)/flash memory or static random access memory (SRAM) solutions.

Firmware may expose an externally accessible interface. For example, in some modem implementations the firmware is not directly accessible but is part of a combination of hardware and firmware that responds to commands from the host system.

Flash memory 107 is used to temporarily store the temporary updated program. One of the MCU typically communicates to the host system through communications interface 109. For example, MCU 1 is the primary (master) microprocessor that mainly communicates with host system and also communicates with other microprocessor during the updating process. With an embodiment, communications interface 109 includes a RF networking transceiver in order to support a wireless communications channel between the host system and processor system 100.

Flash memory 107 is typically non-volatile computer memory that can be electrically erased and reprogrammed. In addition, flash memory 107 often offers fast read access times and better kinetic shock resistance than hard disks. These characteristics are some of the reasons for the popularity of flash memory in portable devices. Flash memory 107 may be classified into NOR and NAND types.

In order to update the firmware of MCU's 101, 103, and 105 by the host system, system 100 performs the following.

1. When a host system (not shown) needs to update all the firmware of the MCU's of the processor 100, the host system, through communications interface 109, initiates a request.
2. MCU 101 (primary MCU) initiates the same request to the secondary MCU's (MCU 103 and MCU 105) through internal communication bus 111.
3. Secondary MCU's 103 and 105 respond, over internal communications bus 111, to primary MCU 101 about their existing firmware version.
4. Primary MCU 101 notifies the host system about the different versions of the firmware of MCU's 101, 103, and 105.
5. Host system sends the firmware of the current (original) versions of MCU's 101, 103, and 105 together with the updated versions through communications interface 109.
6. When primary MCU 101 has received the firmware images, all the programs (computer-executable instructions) are stored in flash memory 107.
7. All programs are verified with checksum or any other data security mechanism by primary MCU 101.
8. Primary MCU 101 internal communication bus 111 to determine whether secondary MCU's 103 and 105 have stopped operation so that primary MCU 101 can start the firmware update.
9. If primary MCU 101 fails to successfully update, primary MCU 101 reverts back to the original version from flash memory 107 since the host system also sent the original version.
10. If primary MCU 101 successfully updates, primary MCU 101 informs the secondary MCU 103 to start its firmware update. If secondary MCU 103 unsuccessfully updates, both MCU's 101 and 103 revert back to their original firmware. (In such a case, MCU 105 did not update so it does not need to revert back.)
11. Step 10 is applied to the remaining secondary MCU's (e.g., MCU 105) until all secondary MCU's have successfully updated.

Figure 2:
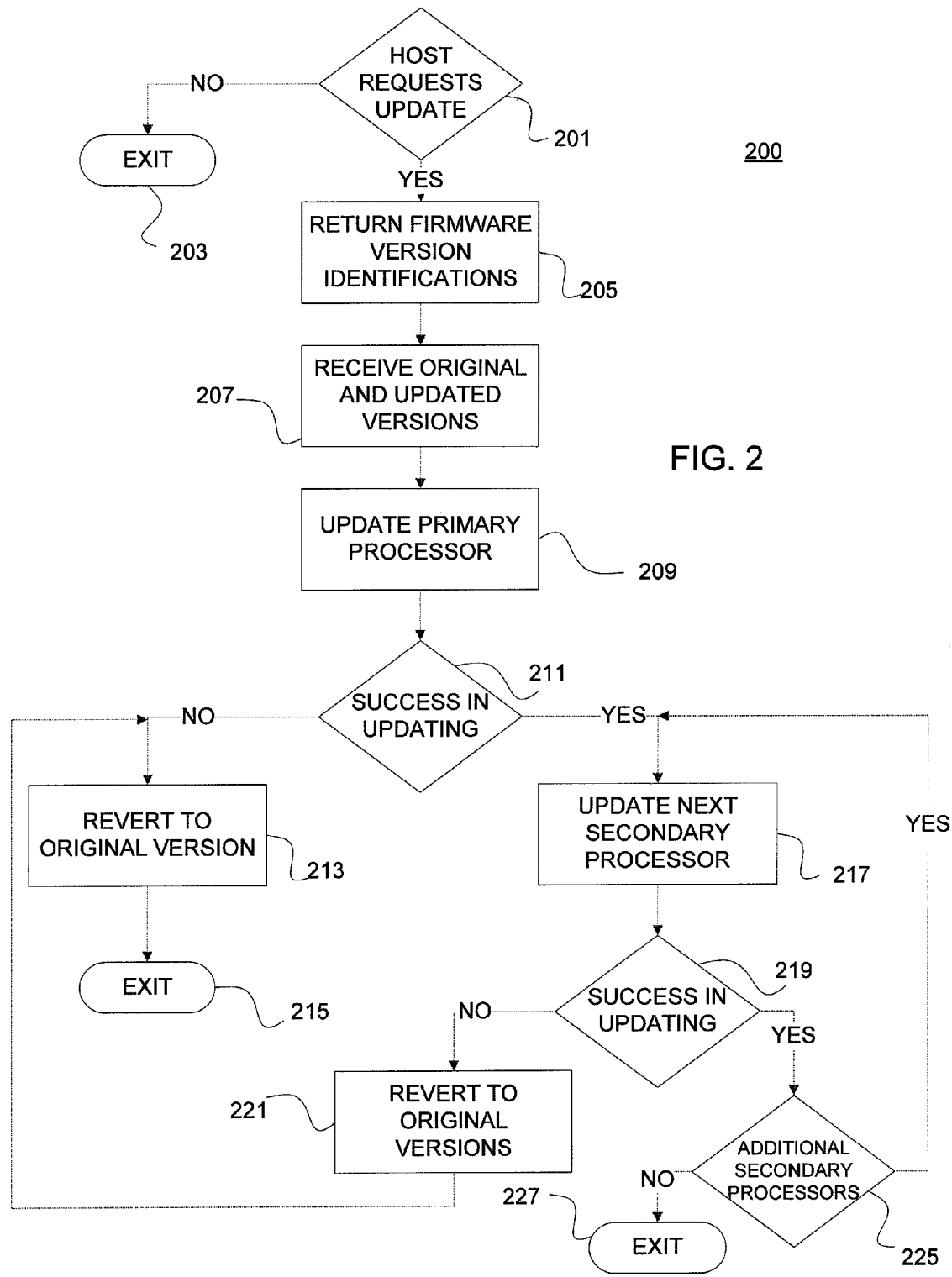
FIG. 2 shows a flow diagram for updating computer-readable instructions in a processor system in accordance with an embodiment of the invention.

FIG. 2 shows flow diagram 200 for updating computer-readable instructions (e.g., firmware) in a processor system (e.g., system 100) in accordance with an embodiment of the invention. With embodiments, flow diagram 200 is executed by the primary processor (e.g., primary processor 101) of the processor system. In step 201, the processor system determines whether the host system has requested a firmware update. If not, process 200 is terminated. Otherwise, the processor system identifies the firmware versions for the processors (e.g., MCU's 101, 103, and 105) in the processor system. In response, the host system sends both the updated firmware version and the original (current) firmware version of each processor over a communications channel to the processor system. With embodiments of the invention, if firmware for a processor has not changed, that processor is not updated. The original firmware versions and the updated firmware versions are subsequently stored in memory, e.g., flash memory 107.

In step 209, the primary processor updates its firmware with the updated firmware version. If the firmware update of the primary processor is not successful, then the primary processor reverts to the original firmware version in step 213, and the processor system terminates process 200. (A firmware update may fail for different reasons, typically because of a hardware problem. For example, a memory bit may be stuck to "1" while the corresponding bit of the updated firmware is "0." In such a case, the old firmware may still be executed.) If the firmware update is successful in step 211, then the processor system continues to update the remaining secondary processors (e.g., processors 103 and 105) with the updated firmware versions in steps 217, 219, 221, and 225. When all of the secondary processors have been updated, process 200 is terminated. Different secondary processors may have different firmware versions to execute different functions within the processor system. If the firmware update fails for any of the secondary processors, the secondary processor, as well as any secondary processor and the primary processor that were previously updated, reverts to the original firmware version in step 221, 213 and process 200 terminates in step 215.

Figure 3:
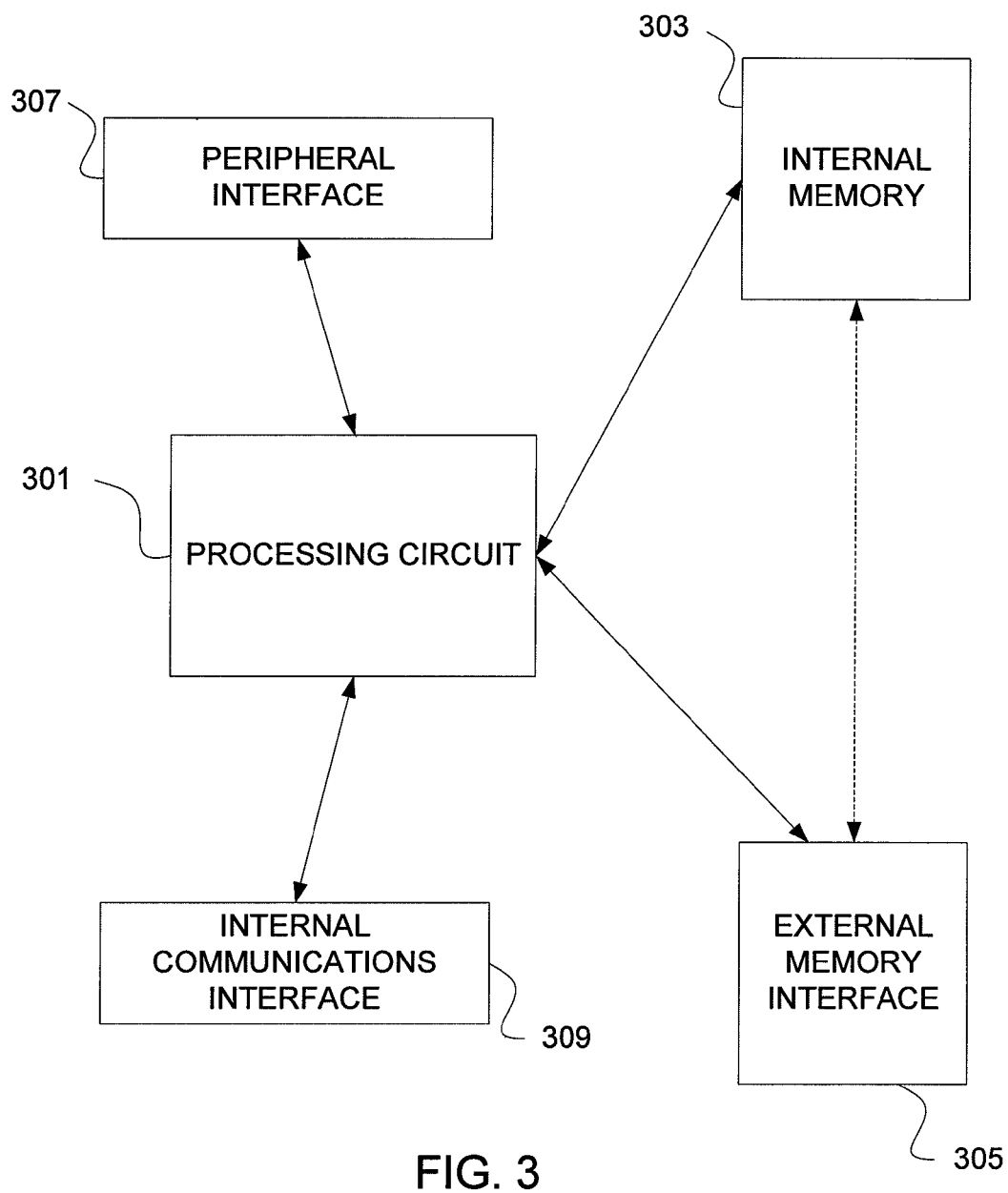
FIG. 3 shows a block diagram of a processor in accordance with an embodiment of the invention.

FIG. 3 shows block diagram 300 of a processor (e.g., processor 101, 103, or 105) in accordance with an embodiment of the invention. Processing circuit 301 executes computer-executable instructions (corresponding to a bootstrap loader) accessed from internal memory 303 in order update its firmware. With embodiments of the invention, the firmware may include both computer-executable instructions for bootstrap loading and for performing intended functions (e.g., controlling an HVAC system). After the firmware has been updated, processing circuit 301 may execute computer-executable instructions to perform its intended functions.

The bootstrap loader loads firmware for processor. With embodiments, internal memory 303 stores both the bootstrap loader and the operational computer-executable instructions, where the updated firmware includes both loader firmware and operational firmware. The loader firmware is typically unchanged in the updated firmware version. (With embodiments of the invention, the bootstrap loader is not updated.) However, embodiments also support configurations in which the bootstrap loader is accessed from a separate memory device (not shown) and may not be updated with the operational firmware that is stored in memory 303. Once the firmware has been loaded (updated), processing circuit 301 executes the operational firmware in order to perform its intended functions.

Updated firmware is obtained through external memory interface 305, which interfaces to external memory, e.g., flash memory 107. The firmware image may be transferred directly to internal memory 303 from external memory interface 305 (direct memory access) or may be transferred through processing circuit 301.

Processing circuit 301 communicates over internal communications bus 111 through internal communications interface 309 in order to communicate with other processors in the processor system.

Processing circuit 300 accesses peripheral devices through peripheral interface 307. Processing circuit 300 may perform intended functions by controlling external peripheral devices (e.g., a thermostat or a motor controller). For example, processing circuit 300 may support communication and protocol processing, where a LCD display and keypad are accessed through peripheral interface 307. Also, when processor 300 operates as the primary processor, processor 300 may communicate with a host system through peripheral interface 307.

Figure 4:
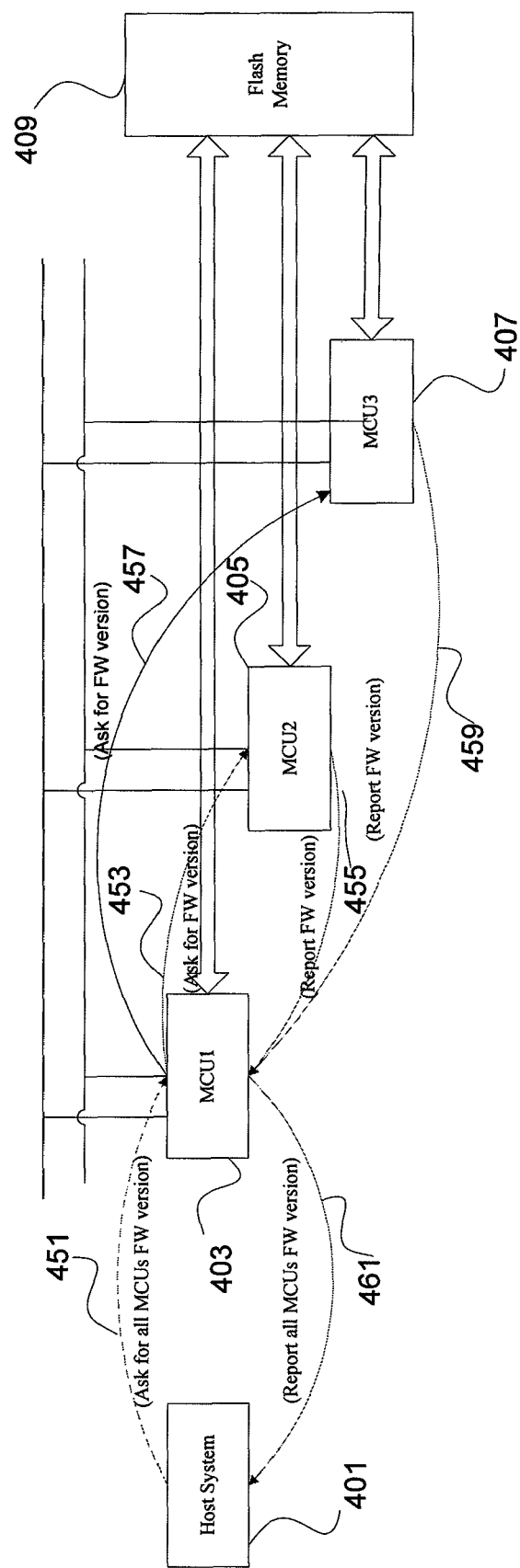
FIG. 4 shows a scenario for a host system obtaining the current firmware versions of the processors in a processor system in accordance with an embodiment of the invention.

FIGS. 4-10 show scenarios that may be supported by system 100 in order to update firmware. As shown in FIG. 4, host system 401 asks primary processor 404 about the firmware versions of processors 403, 405, and 407 in step 451. Primary processor 403 obtains the current firmware versions of secondary processors 405 and 407 in steps 453-459. Primary processor 403 subsequently reports the current firmware versions of the processors (including itself) to host system 401 in step 461. In the scenarios shown in FIGS. 4-10, it is assumed that only processors 403 and 405 are updated.

Figure 5:
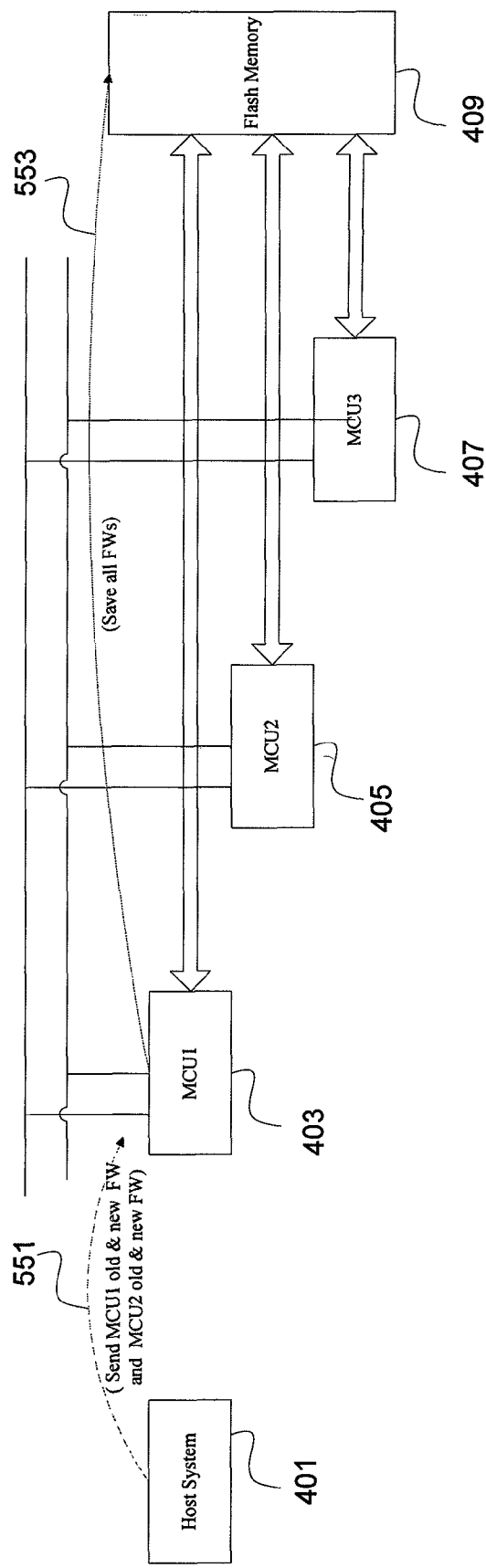
FIG. 5 shows a scenario for a host system providing old and new firmware versions to the processor system in accordance with an embodiment of the invention.
Figure 6:
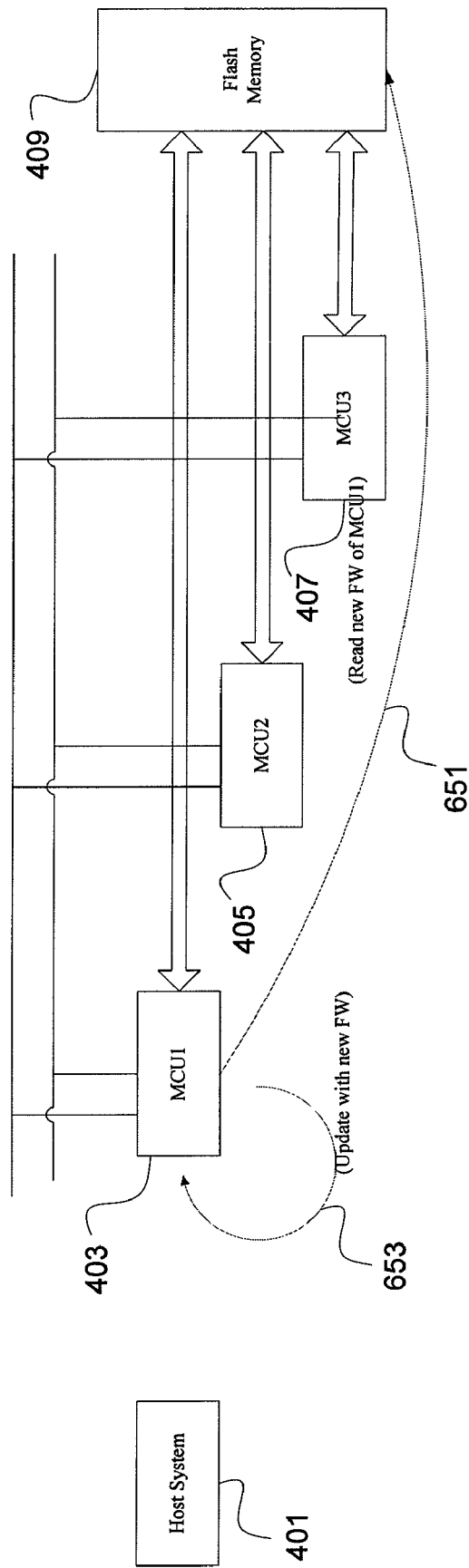
FIG. 6 shows a scenario for the primary processor updating its firmware in accordance with an embodiment of the invention.

As shown in FIG. 5, host 401 sends current and updated firmware versions for processors 403 and 405 to primary processor 403 in step 551. The firmware images are saved into flash memory 409 in step 553. As shown in FIG. 6, primary processor 403 accesses its updated firmware image from flash memory 409 in step 651 and updates its firmware in step 653.

Figure 7:
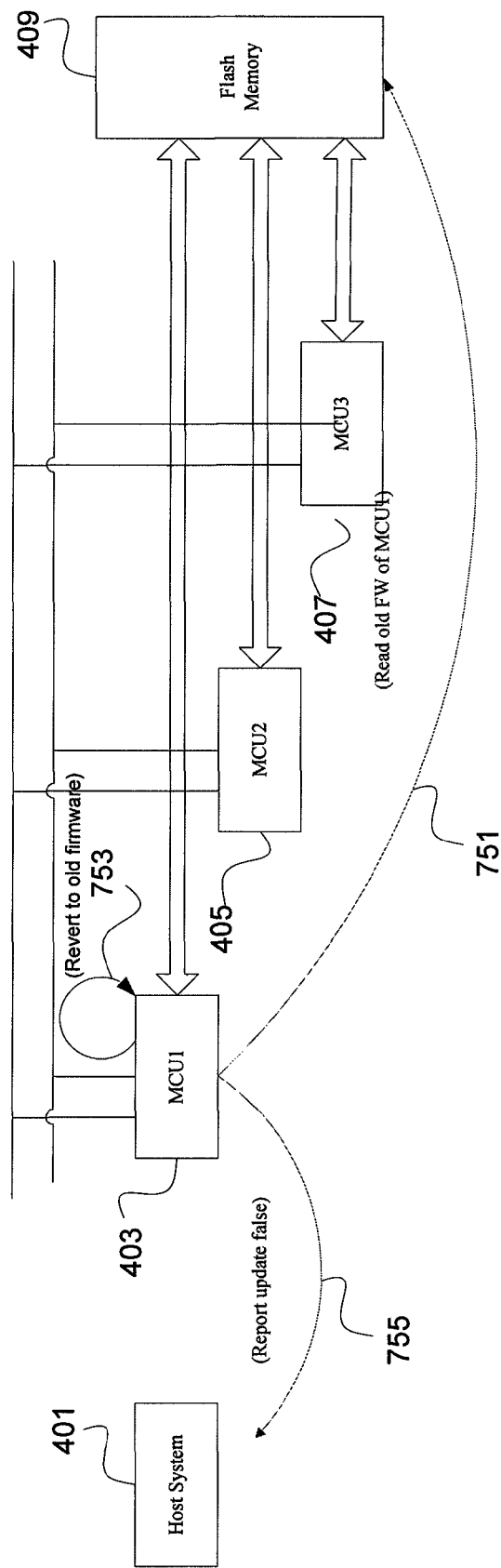
FIG. 7 shows a scenario when the primary processor unsuccessfully updates its firmware in accordance with an embodiment of the invention.
Figure 8:
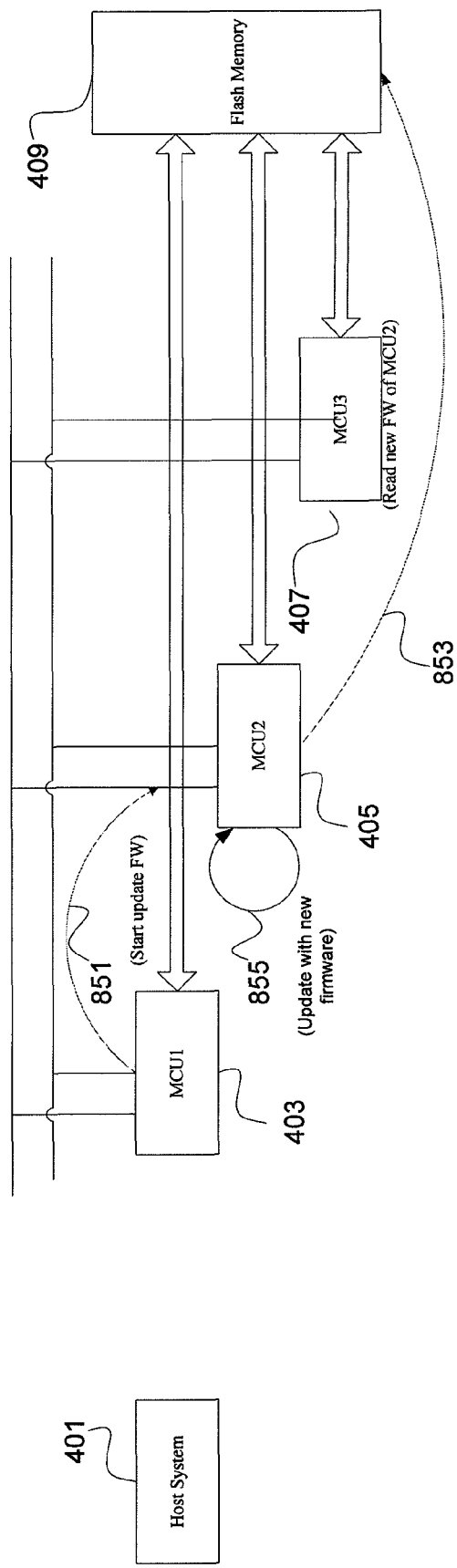
FIG. 8 shows a scenario when the primary processor successfully updates its firmware and initiates updating the firmware of a secondary processor in accordance with an embodiment of the invention.

Firmware update 653 will either fail or succeed as shown in FIG. 7 and FIG. 8, respectively. If the update fails, primary processor 403 reads the old firmware image from flash memory 409 in step 751 and reverts to the old firmware in step 753. Primary processor 403 reports the results of the firmware update in step 755. If the update succeeds, primary processor 403 instructs secondary processor 405 to update its firmware in step 851. Consequently, processor 405 reads its updated firmware image from flash memory 409 in step 853 and updates its firmware in step 855.

Figure 9:
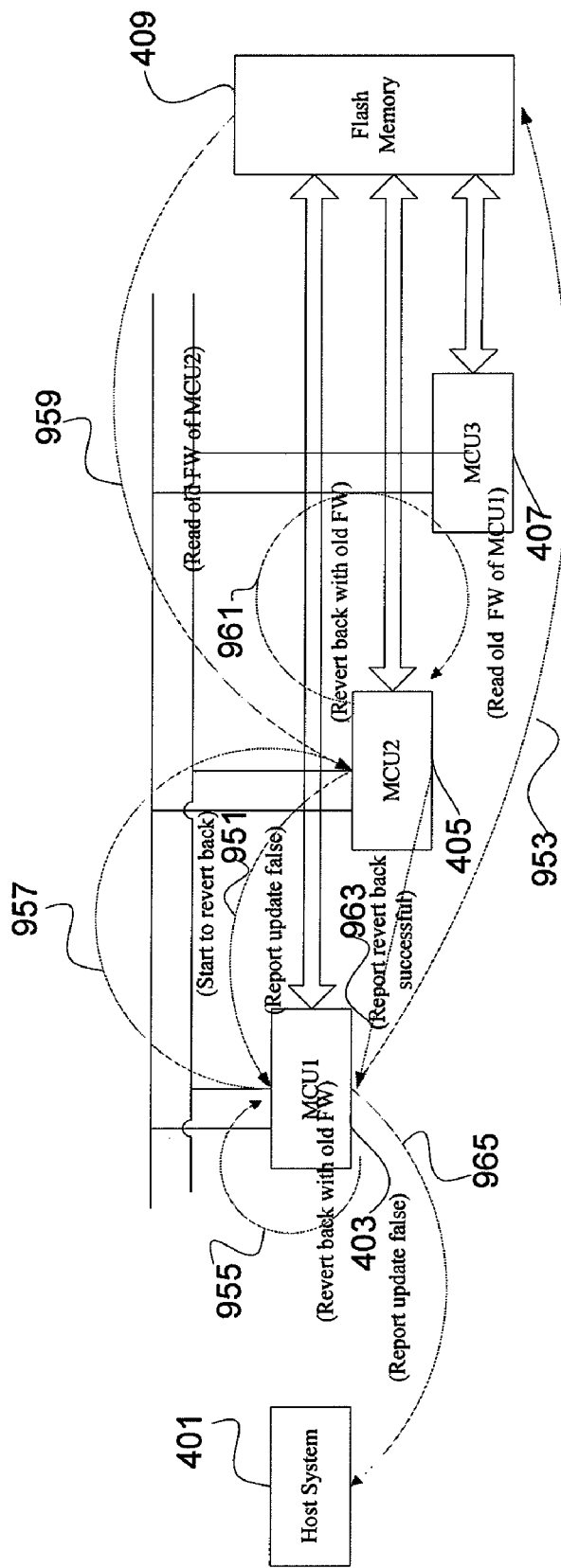
FIG. 9 shows a scenario when the secondary processor unsuccessfully updates its firmware in accordance with an embodiment of the invention.
Figure 10:
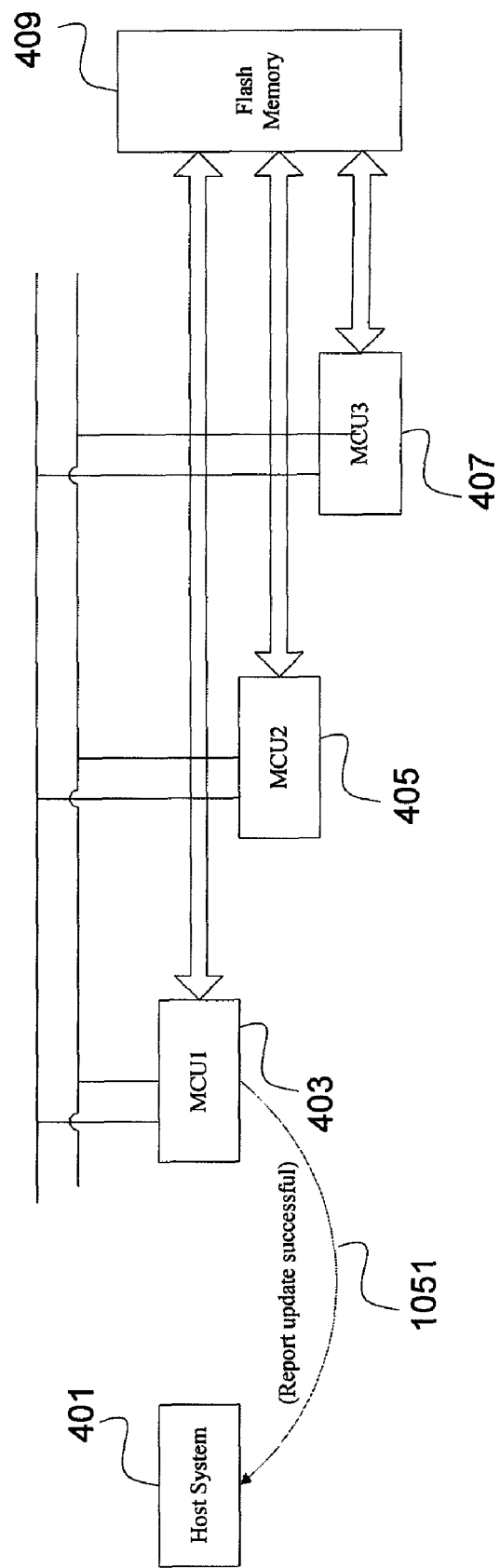
FIG. 10 shows a scenario when the secondary processor successfully updates its firmware in accordance with an embodiment of the invention.

Firmware update 855 will either fail or succeed as shown in FIG. 9 and FIG. 10, respectively. If the update fails, secondary processor 405 informs primary processor 403 of the failure in step 951. In steps 953-963 processors 403 and 405 revert back to the old version of the firmware, Primary processor 403 subsequently reports the results of the firmware update in step 965. If the update succeeds, primary processor 403 informs host system 401 about the firmware update in step 1051.

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 101. Such a processor may execute computer-executable instructions stored on a computer-readable medium.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a memory;
a second processor;
a communications interface;
a first processor configured to:
receive an initiation request to update computer-readable instructions for the apparatus that are executable on a plurality of processors that include the first processor and the second processor;
notify, through the communications interface, a host system about original computer program versions associated with the plurality of processors, wherein a first original computer program version is associated with the first processor and a second original computer program version is associated with the second processor;
receive, through the communications interface, a first original set of computer-readable instructions and a first updated set of computer-readable instructions that are associated with the first processor and a second original set of computer-readable instructions and a second updated set of computer-readable instructions that are associated with the second processor;
store the first original set, the first updated set, the second original set, and second updated set in the memory;
initiate updating the first processor with the first updated set of computer-readable instructions from the memory;
when the first processor does not successfully update, revert to the first original set of computer-readable instructions for the first processor;
when the first processor has successfully updated with the first updated set of computer-readable instructions, initiate updating the second processor with the second updated set of computer-readable instructions from the memory; and
when the second processor does not successfully update, revert to the second original set of computer-readable instructions for the second processor and to revert to the first original set of computer-readable instructions for the first processor.

2. The apparatus of claim 1, further comprising:
a third processor; and
wherein the first processor is further configured to:
receive a third original set of computer-readable instructions and a third updated set of computer-readable instructions that are associated with the third processor;
store the third original set and the third updated set in the memory;
initiate updating the third processor with the third updated set of computer-readable instructions from the memory when the first processor and the second processor have successfully updated; and
when the third processor has not successfully updated, revert to the original sets of computer-readable instructions for the corresponding processors.

3. The apparatus of claim 1, wherein the memory comprises a flash memory.

4. The apparatus of claim 1, wherein the first original set of computer-readable instructions is embedded on the first processor.

5. The apparatus of claim 1, wherein the first processor is further configured to:
verify, by a data security mechanism, the first original set, the first updated set, the second original set, and second updated set in the memory after storing the sets in the memory.

6. The apparatus of claim 5, wherein the data security mechanism comprises a checksum.

7. The apparatus of claim 1, further comprising:
an internal communications bus; and
wherein the first processor is further configured to:
instructing, over the internal communications bus, the second processor to terminate operation before initiating updating.

8. The apparatus of claim 1, wherein the first original computer program version is different from the second original computer program version.

9. The apparatus of claim 1, wherein the communications interface interfaces to a wireless communications channel.

10. A method comprising:
receiving an initiation request to update computer-readable instructions that are executable on a plurality of processors that include a first processor and a second processor;
notifying a host system about original computer program versions associated with the plurality of processors, wherein a first original computer program version is associated with the first processor and a second original computer program version is associated with the second processor;
receiving a first original set of computer-readable instructions and a first updated set of computer-readable instructions that are associated with the first processor and a second original set of computer-readable instructions and a second updated set of computer-readable instructions that are associated with the second processor;
storing the first original set, the first updated set, the second original set, and second updated set in a memory;
updating the first processor with the first updated set of computer-readable instructions from the memory
when the first processor does not successfully update, reverting to the first original set of computer-readable instructions for the first processor;
when the first processor has successfully updated with the first updated set of computer-readable instructions, updating the second processor with the second updated set of computer-readable instructions from the memory; and
when the second processor does not successfully update, reverting to the second original set of computer-readable instructions for the second processor and reverting to the first original set of computer-readable instructions for the first processor.

11. The method of claim 10, further comprising:
receiving a third original set of computer-readable instructions and a third updated set of computer-readable instructions that are associated with a third processor;
storing the third original set and the third updated set in the memory;
updating the third processor with the third updated set of computer-readable instructions from the memory when the first processor and the second processor have successfully updated; and
when the third processor has not successfully updated, reverting to the original sets of computer-readable instructions for the corresponding processors.

12. The method of claim 10, wherein the memory comprises a flash memory.

13. The method of claim 10, wherein the first original set of computer-readable instructions is embedded on the first processor.

14. The method of claim 10, further comprising:
verifying the first original set, the first updated set, the second original set, and second updated set in the memory after storing the sets in the memory.

15. The method of claim 14, further comprising:
verifying the stored sets of computer-readable instructions with a checksum.

16. The method of claim 10, further comprising:
instructing the second processor to terminate operation before initiating updating.

17. The method of claim 10, wherein the first original computer program version is different from the second original computer program version.

18. The method of claim 10, wherein the first processor communicates the host computer over a wireless communications channel.

19. A non-transitory computer-readable medium having computer-executable instructions that when executed perform:
receiving an initiation request to update firmware that is executable on a plurality of processors that include a first processor and a second processor;
notifying a host system about original computer program versions associated with the plurality of processors, wherein a first original computer program version is associated with the first processor and a second original computer program version is associated with the second processor;
receiving a first original set of computer-readable instructions and a first updated set of computer-readable instructions that are associated with the first processor and a second original set of computer-readable instructions and a second updated set of computer-readable instructions that are associated with the second processor;
storing the first original set, the first updated set, the second original set, and second updated set in a memory;
updating the first processor with the first updated set of computer-readable instructions from the memory;
when the first processor does not successfully update, reverting to the first original set of computer-readable instructions for the first processor;
when the first processor has successfully updated with the first updated set of computer-readable instructions, initiate updating the second processor with the second updated set of computer-readable instructions from the memory; and
when the second processor does not successfully update, revert to the second original set of computer-readable instructions for the second processor and to revert to the first original set of computer-readable instructions for the first processor.

* * * * *